Sept. 29, 1970  W. R. EHLO  3,530,718
ELECTRIC THERMOMETER
Filed Oct. 17, 1967

Walter R. Ehlo
INVENTOR.

BY

ATTORNEYS

United States Patent Office 3,530,718
Patented Sept. 29, 1970

3,530,718
ELECTRIC THERMOMETER
Walter R. Ehlo, San Antonio, Tex., assignor to Research and Aviation Development, Inc., San Antonio, Tex., a corporation of Texas
Filed Oct. 17, 1967, Ser. No. 679,589
Int. Cl. G01k 7/24; H01c 7/04
U.S. Cl. 73—362
9 Claims

ABSTRACT OF THE DISCLOSURE

An electric thermometer for use primarily in the medical field which utilizes a replaceable probe that may be subjected to sterilization containing two thermistors which may be matched to achieve the desired resistance. Thus, the current flowing through a meter to which the thermistors are operatively connected will vary with the temperature of the probe's environment. A bleed resistor is also utilized across the voltage source. The thermometer is comprised of a housing carrying the meter and most of the electrical circuitry, and this housing is connected to the interchangeable probe by a flexible cord.

---

Figure 1:
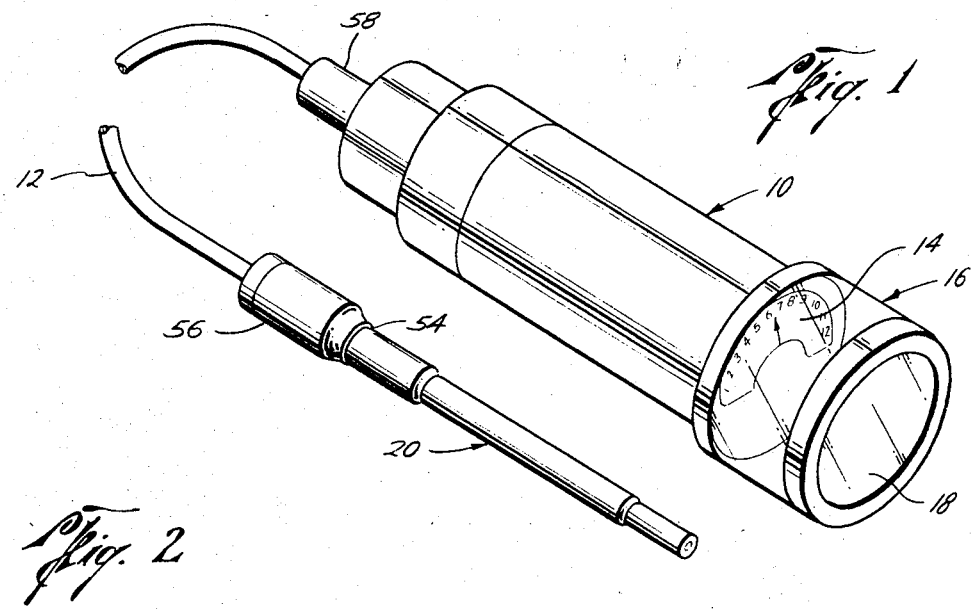

The present invention relates to apparatus for determining the temperature of an environment or media, and more particularly, to electric thermometers for use in the medical field.

Today, the most common type of temperature indicating apparatus, especially in the medical field, are glass thermometers filled with mercury or other temperature sensitive fluids, properly gauged to indicate the temperature that will produce a known amount of expansion of this fluid. Such thermometers are, however, fragile and may cause injury to the operator or user if broken. A common problem along this line is the breaking of the thermometer by being bitten when used by a child who resists. Furthermore, such thermometers are slow in indicating the temperature, difficult to read, and are clinically unsterile. They may be sterilized only by chemical means, such as an alcohol path. Such methods are not as effective, however, as boiling the instrument or placing it in an autoclave. Glass thermometers are also relatively inaccurate due to the lack of uniform quality control during construction.

Electric thermometers have been attempted but have met with only small success due to difficulties which the present invention seeks to overcome or circumvent. Various attempts have been made to employ the thermocouple in electric thermometers by utilizing the electricity created when the thermocouple is exposed to temperature changes. Their use has been quite limited, however, because of the necessity of rather expensive and sophisticated equipment and due to quality control difficulties that make their accuracy doubtful. A further disadvantage is found in the fact that they are relatively slow in response.

With the advent of a thermistor, a practical temperature sensing element appeared and attempts to utilize this in an electric thermometer have met with some degree of success. These are generally used in one leg of a bridge circuit. Certain disadvantages were discovered, however, such as the fact that the apparatus had to be calibrated for each use and that all parts were critical, requiring a high degree of control for accuracy. Furthermore, thermistor characteristics are such that they are not readily interchangeable without high cost for the selection and matching to the particular unit and/or range of temperatures being used. Various factors, such as the ambient temperature, create constant errors or changes in the components of the system so that the reliability becomes questionable.

The present invention utilizes a unique and novel arrangement of elements to provide an electric thermometer having a high degree of accurateness and reliability. Two voltage sources are connected into two parallel circuits, the circuits having a common leg which contains a gauge, meter or similar means having a scale to indicate the temperature. Resistance means are also included in the two circuits in series with the voltage source in th respective circuits.

When the two circuits are closed, the amount of current that flows through the common leg varies with the difference in potential across the common leg. By proper selection of the two resistance means and voltage sources, these circuits will be balanced and the potential across, and accordingly, the current flowing through, the common leg will be zero.

By utilizing a resistance means whose resistance varies in known amounts as its temperature changes, the current will flow through the meter in varying quantities depending upon this change in resistance. The amounts of current that will flow through the meter when the variable resistance means is at different temperatures can be determined. By calibrating the meter to respond to the various amounts of current flowing therethrough, the meter will indicate the temperature of the variable resistance means in response to these known amounts of current for certain temperature ranges.

The present invention further utilizes a test resistor which may be connected into the circuit in place of the variable resistance means, the test resistor having a known, essentially constant, resistance for testing the operation of the apparatus easily and quickly prior to each use.

The present invention also utilizes a novel construction whereby the temperature responsive, variable resistance means is removed from the major portion of the remainder of the circuitry involved and is encased in a probe which may be properly sterilized. Utilization of two variable resistance means in the probe gives uniformity in the total resistance of the probe, thereby allowing interchangeability of probes without further calibration of the apparatus.

Other novel and non-obvious structural and functional features are set forth in the body of the specification.

It is, therefore, an object of the present invention to provide an electric thermometer for the determination of temperatures of various environments.

A still further object of the present invention is to utilize resistance means whose resistance varies with its temperature, for example, thermistors, to send varying amounts of current through a meter or gauge calibrated to indicate the temperature of the variable resistance means in response to the varying quantities of current it receives.

It is a further object of the present invention to provide such a thermometer as set forth above, having the variable resistance means encased in readily interchangeable and unbreakable probes which may be sterilized by boiling or by use of an autoclave.

An additional object of the present invention is to provide an electric thermometer which requires no calibrations subsequent to the assembly thereof during the normal operation of the thermometer in spite of the interchanging of probes, by the use of the combination of two variable resistance means to provide a total resistance which is essentially constant in all probes; and which incorporate structure to provide a simple and quick test to insure that the apparatus is operating properly.

A still further object of the present invention is to provide a small but constant current flow from said voltage sources to prevent voltage "spikes" which could cause an erroneous temperature reading.

Figure 2:
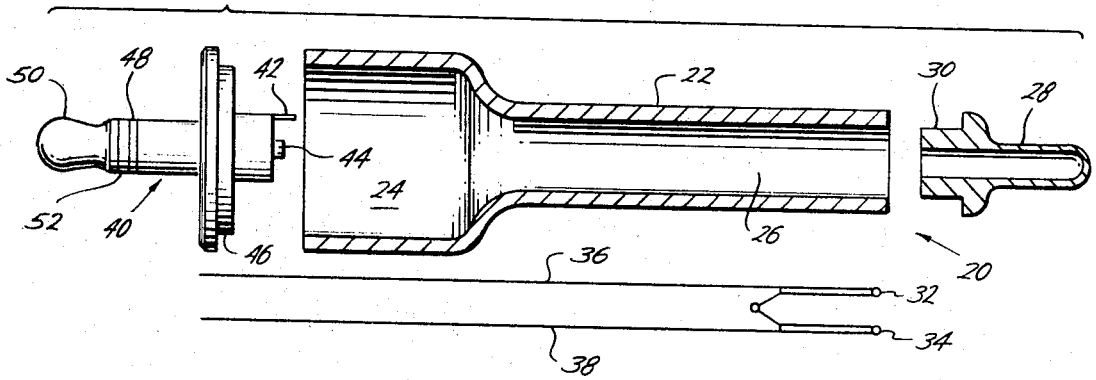
Figure 3:
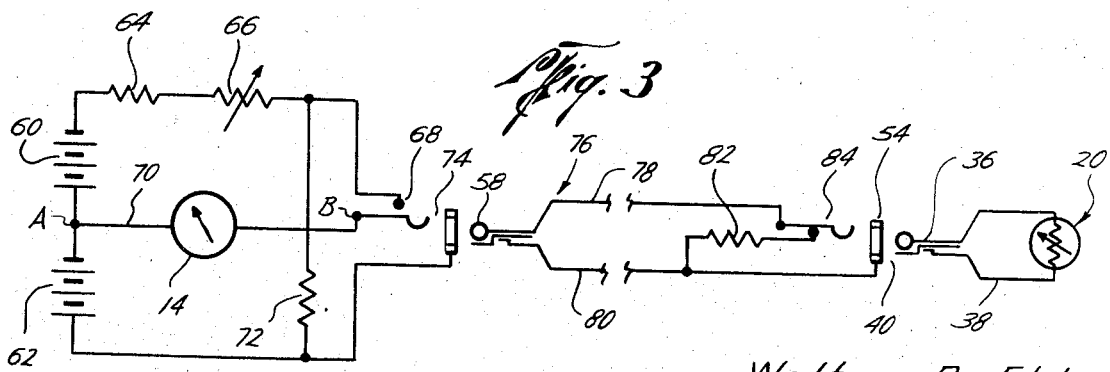

Other and further objects, features and advantages will be apparent from the following description of the presently preferred embodiment of the invention given for the purpose of disclosure, and taken in conjunction with the accompanying drawings, wherein like character references designate like parts throughout the several views, and where:

FIG. 1 is a perspective view of the presently preferred embodiment of the invention, FIG. 2 is an exploded view of the presently preferred embodiment of the probe, portions thereof being in section for purposes of illustration, and FIG. 3 is a schematic diagram showing the preferred electric circuitry utilized in the embodiment shown in FIG. 1.

For purposes of explanation, the present invention will be described as utilized in a thermometer constructed for medical and veterinary uses. It is, of course, intended to be used in various other applications in science, industry, etc.

Referring now to FIG. 1 of the drawing, the present invention comprises generally a head unit 10 and the probe 20. The probe is connected to the head by means of an electrically insulated cord 12. A scale 14 is shown encased within the glass or plastic enclosure generally indicated at 16. The back 18 of the enclosure is comprised of a magnifying glass for easier reading of the scale 14.

Turning now to FIG. 2, there is shown an enlarged and exploded view of the probe with portions thereof being in section. The probe, generally indicated by the numeral 20, is comprised primarily of a main housing 22 which is a substantially hollow cylindrical member composed of stainless steel and having one open end thereof enlarged as shown at 24. The opposite end 26 is substantially smaller. The tip 28 of the probe has a neck portion 30 of essentially the same diameter as the inside diameter of the smaller opening 26, whereby an interference or press fit may be achieved when the tip is inserted into the opening 26. The tip is composed of stainless steel and houses the thermistors 32 and 34.

The very tip of the thermistors are soldered to the stainless steel tip 28, the remainder of the thermistors being epoxy cemented to the tip. The soldering of the thermistor tips insures a rapid heat transfer from the environment or media being measured through the tip 28 and the solder, to the thermistor itself.

The thermistors are connected in series by the leads 36 and 38 which extend back through the main housing 22. After the tip 28 is inserted into the opening 26, the leads 36 and 38, which are Teflon insulated, are then epoxy cemented to the sidewalls of the housing 22. The leads are then connected to the terminals 42 and 44 of the plug generally indicated by the numeral 40.

The plug 40 has an outstanding flange 46 dimensioned to form a press fit with the housing 22 when the plug is inserted into the enlarged opening 24. The output terminals of the jack are located at 48 and 50. Insulating band 52 separates the output terminals.

The epoxy cement serves to further insulate the tip 28, both electrically and thermally, from the probe body or housing 22. The plug 40 and tip 28, in addition to being press or interference fitted with the housing 22, are also epoxy cemented thereto. All stainless steel parts of the probe are preferably polished prior to assembly and little cleaning is necessary subsequent to the assembly operation.

The probes constructed in the above described manner are substantially unbreakable and will withstand temperatures as high as 600° F. without damage. Accordingly, this allows the probes to be sterilized in an autoclave or by boiling.

Referring back to FIG. 1, the probe 20 by its plug 40 (seen in FIG. 2) is inserted into the opening or jack 54, which is a portion of the housing 56. Extending from the end of housing 56 opposite the jack 54 is the cord 12 which connects the housing 56, and the inserted probe, with the head unit 10. The connection is made by the insertion of the plug 58 into the jack 74 (shown in FIG. 3) located in the rear of the head unit.

Referring now to FIG. 3, there is shown a schematic diagram of the preferred arrangement for the electrical circuitry necessary to perform the present invention. Two voltage sources or batteries 60 and 62 are shown connected in parallel circuits. Connected in series with the voltage source 60 is a resistor 64 which has a known essentially constant resistance. Also connected in series is a calibration potentiometer or variable resistor 66. A switch 68 is connected in this first circuit and is normally in an open position whereby no current flows through this circuit. The first circuit is completed by the common leg 70 which contains the meter 14. The common leg is defined by the output terminals A and B.

Connected in series with the voltage source 62 is the jack 74. These, in combination with the common leg 70, comprise the second circuit. The jack 74 is normally open so that no current flows through the second circuit.

The switch 68 in the first circuit is operatively positioned adjacent the jack 74 so that insertion of plug 58 into jack 74, which insertion closes the second circuit, also operates to close the switch 68, whereby both circuits are closed. Both the first and the second circuits are located in the head unit 10.

A third circuit generally indicated at 76 is comprised of the plug 58, the leads 78 and 80 and the jack 54. Also included in the third circuit 76 is a resistor 82 having a switch 84 which is connected to the jack 54. The switch 84 is normally closed and is so constructed and connected to the jack 54, that the insertion of plug 40 into jack 54 will open the switch, thereby disconnecting the resistor 82 from the circuit 76. Removal of the plug 40 from the jack 54 causes the switch 84 to close thus completing the circuit through the resistor 82. The third circuit 76 is housed in the cord 12 and housing 56. In particular, the resistor 84 is located in the housing 56, as is the jack 54.

Once again the probe is indicated by the numeral 20 and comprises the leads 36 and 38, the plug 40 and the thermistors 32 and 34 which are indicated symbolically by a single figure in FIG. 3.

Finally, the bleeder resistor 72 is connected across the voltage sources 60 and 62 to provide for a continuous current leak from the batteries. This prevents the build-up of voltage "spikes" in the voltage sources when the unit is not in use.

Turning now to the operation of the present invention, the thermometer head 10 is normally encased in a sling or sheathe which is worn around the neck and holds the head 10 in a generally vertical position with the glass enclosure 16 extending upwardly for ease of reading. When the thermometer is not in use, the cord 12 is removed from the head by disengaging the plug 58 from the jack 74. As previously explained, when the plug 58 is not inserted in jack 74 both circuits are open and no current flows from the voltage sources 60 and 62, except for the negligible amount bled through the resistor 72.

The operator inserts the plug 58 into jack 74 thereby connecting the cord 12 and the housing 56 to the head unit 10. Insertion of the plug 58 into the jack 74 will close the second circuit which contains the voltage source 62 thereby allowing current to flow in this circuit. As pointed out above, the switch 68 is connected to the jack 74, whereby insertion of the plug 58 causes the switch to close. This completes the first circuit and allows current to flow from the voltage source 60. Since the probe 20 has not yet been inserted into the jack 54 the switch 84 is closed and the resistor 82 is connected in series with the second circuit.

At this point, we have two completed parallel circuits having a common leg 70, or stated another way, we have a perimeter circuit having output terminals A and B to which is connected the meter 14 by the wiring 70. The amount of current that will flow through the wiring 70, and in turn the meter 14, will depend on the potential difference existing between output points A and B. The voltage sources 60 and 62 are selected to have equal output. If the total resistance from the resistors 64 and 66 equal the resistance of the resistor 82, the potential different between terminals A and B will be zero and no current will flow through the leg 70 and meter 14.

This is not the case, however, in the present invention. The resistor 82 is selected in view of the total resistance provided by resistor 64 and variable resistor 66 to unbalance the perimeter circuit, whereby a known amount of current should pass through the common leg 70 if all of the elements of the apparatus are working properly. The meter 14 has been calibrated to indicate the temperature of the thermistors 32 and 34 in response to the amounts of current flowing through the meter. This may be achieved since the variation in resistance in the thermistors is a known variation and can be predicted, as can the resultant current flow through leg 70. Accordingly, the meter may be properly calibrated to indicate the temperature of the thermistors in response to the current flow.

In like manner, the resistance 82 is preselected to have a specific resistance whereby a known amount of current will pass through the meter causing the meter to indicate a certain test temperature. The operator can then determine whether or not the batteries 60 and 62 are functioning properly and whether or not the potentiometer 66 and meter 14 have been properly calibrated. A variation in indication on the temperature scale of the meter will inform the operator that the unit is not working properly.

Assuming that the scale registers on the proper test temperature to insure accurate operation of the thermometer, the operator then selects a probe 20 which is packaged in a sterile container. The container is removed and the plug 40 of the probe is inserted in the jack 54, the operator being at all times careful not to contaminate the probe. Insertion of the plug 40 opens switch 84 and disconnects the resistor 82 as was previously explained. Now the thermistors 32 and 34 are connected in series with the second circuit. At this point the temperature of the thermistors is approximately room temperature. Either no current will flow through the leg 70, or current will flow in an amount for which the meter will not register (i.e. below the pre-set scale), since it is calibrated to respond to the particular amounts of current that will flow when the thermistor temperature is within a given range, for example, from 95° to 106° F.

The tip of the probe is then placed in the patient's mouth under one side of his tongue for at least five seconds. This allows the stainless steel jacket of the probe to warm, but in so doing, this side of the patient's tongue and mouth will cool. Accordingly, the probe must be then shifted to the opposite side of the mouth and under the tongue. In the next ten seconds the indicating means on the meter will begin to rise and will settle at the correct temperature in response to the change in temperature and resistance of the thermistor. After the temperature is noted or recorded, the probe is then removed from the mouth and disconnected from the cord 12. This probe is placed in a container for sterilization and thereafter a second, previously sterilized probe is selected and inserted for the next patient.

After all of the temperatures have been taken, the cord is removed from the head 10, whereby all circuits are opened and current no longer flows with the exception of a small current that flows from the voltage source by virtue of the bleeder resistor 72 which is connected across the voltage source. This current is quite small due to the extremely high resistance of resistor 72, for example, 50,000 ohms, and is intended merely to prevent the buildup of voltage "spikes" in the voltage source.

The characteristics of thermistors presented an interchangeability problem in an electric thermometer due to the fact that it is difficult to obtain individual thermistors having the same resistance. Accordingly, to provide for the interchangeability of probes, it would be necessary to recalibrate the unit for each new probe. This would, of course, be a significant advantage and would possibly result in the accuracy of the instrument becoming doubtful. An alternative solution to the problem would be the proper selection of thermistors which would result in a high cost due to the method of selection and/or system of matching probes.

The present invention overcomes this disadvantage by the utilization of two thermistors to give the desired resistance. The thermistors are matched with each other and when two are found having the desired total resistance, they are placed in the same probe. By way of example, suppose the desired resistance of 1,000 ohms at 25° C. was required. By matching thermistors, either manually or by machine, numerous combinations of thermistors could be found whose sum total resistance equaled 1,000 ohms at the required temperature level. For example, a thermistor having a resistance of 700 ohms at 25° C. could be matched with one having 300 ohms at that temperature level; or 650 ohms, and 350 ohms. As one can see, the combinations possible are quite large and in each case the probe could have the same resultant resistance, whereby they may be interchanged without further calibration. All calibration required is, therefore, performed during the assembly of the thermometer.

The resistors 64 and 66 are selected to give the proper balance or degree of unbalance necessary for the thermistors used. Fine semi-permanent adjustment is provided by the use of a variable resistor or potentiometer 66. The meter 14 is then calibrated to respond to the amounts of current that will flow through it when the temperature of the thermistors lie within the desired range. The resistor 82 is also selected cooperate with the resistors 64 and 66 to provide the proper degree of unbalance in the system so that a known amount of current will flow through, and accordingly, a known test reading will result in, the meter 14. In accordance with the values previously given, resistors 64, 66 and 82 may be 680, 200 and 720 ohms respectively, while the meter may measure 0–100 microamps. The two voltage sources 60 and 62 are preferably constant voltage mercury cells having a flat output characteristic of 1.35 volts.

As can be seen the present invention, as described and illustrated by the embodiment disclosed herein, achieves the objectives set forth at the outset. A practical and reliable device has been constructed to determine temperatures of various environments or media quickly and to an accurate degree. An instrument has been constructed which has an extremely long life and achieves a high degree of indestructibility. The probes may be completely sterilized by boiling or by placing in an autoclave, and will take a great amount of improper handling. The probes may even be bent and still function properly. The probes are completely interchangeable, requiring no calibration of the unit for different probes. The head section is subject to damage from violent actions but is normally made to withstand rough treatment, as is the cord. A test resistor is utilized whereby the proper operation of the instrument may be insured before temperatures are taken. Where desired, elimination of this test resistor and of the cord may be achieved, and a probe connected directly to the head unit. The thermometer scale is much more easily read than normal glass thermometers due to the enlarged scale and the magnifying lens over the scale. Batteries are the only components that require periodic replacement over the long life of the unit. The circuitry involved is relatively simple and stable, as well as being novel and unique. The head unit as well as the cords may be made to withstand boiling or autoclave temperatures so that the part of the unit which contacts a patient may be sterilized.

The present invention therefore, is well adapted to carry out the objects and obtain the ends and advantages mentioned as well as others inherent therein. While the presently preferred embodiment of the invention has been given for the purpose of disclosure, numerous changes in the detail of construction and the combination, shape, size and arrangement of parts may be resorted to without departing from the sphere and scope of the invention as hereinafter claimed.

What is claimed is:

1. An electric thermometer including,
a circuit comprised of,
a first constant voltage source,
a second constant voltage source having the same potential as the first voltage source,
a resistor of fixed value,
a resistor whose value varies as an inverse function of its temperature,
wires electrically interconnecting in series said first and second voltage source, said second voltage source and said fixed resistor, said fixed resistor and said variable resistor, and said variable resistor and said first voltage source,
a two terminal meter responsive to current flow,
said first meter terminal electrically connected between said first and second voltage source,
said second meter terminal electrically connected between said fixed and said variable resistors,
said meter calibrated to indicate temperature as a function of current flow therethrough,
said thermometer further including, a probe having a tip, said variable resistor being further defined as including,
two thermistors electrically connected in series and arranged in heat conductive relationship with said probe tip, said thermisters being paired to give the desired total resistance.

2. The invention of claim 1 including:
switching means in said circuit electrically interconnecting said fixed resistor, variable resistor and second meter terminal in a first position and disconnecting said fixed resistor, variable resistor and second meter terminal in a second position.

3. The invention of claim 2 wherein:
the wires electrically connecting said variable resistor to said first voltage source and said switching means include an elongate cord,
said switching means including a jack,
said cord having a plug at one end which when mated with said jack puts said switching means in the first position,
said cord having a jack at the other end,
a test resistor and a normally closed switch connected in series across said cord within said cord jack,
said probe having a plug attached to said housing and electrically connected to said variable resistor, and
said probe plug when mated with said cord jack electrically interconnects said variable resistor and cord and opens said normally closed switch in said cord jack,
whereby removing said probe from said cord and inserting said cord into said jack electrically connects said test resistor into said circuit in place of said variable resistor.

4. The invention of claim 1 wherein said circuit includes:
an adjustable calibration resistor connected electrically in series with said fixed resistor,
whereby said calibration resistor may be adjusted to calibrate the meter and provide for tolerance variables in the electrical circuit elements.

5. The invention of claim 2 including:
a bleeder resistor of substantially high resistance electrically connected across said switching means,
whereby a small constant flow of current passes from said voltage sources when said switching means is disconnected.

6. An electric thermometer circuit including,
a first constant voltage source,
a second constant voltage source having the same potential as the first voltage source,
a resistor of fixed value,
a resistor whose value varies as an inverse function of its temperature,
wires electrically interconnecting in series said first and second voltage source, said second voltage source and said fixed resistor, said fixed resistor and said variable resistor, and said variable resistor and said first voltage source,
an adjustable calibration resistor connected electrically in series with said fixed resistor, whereby said calibration resistor may be adjusted to calibrate the meter and provide for tolerance variables in the electrical circuit elements, a two terminal meter responsive to current flow,
said first meter terminal electrically connected between said first and second voltage source,
said second meter terminal electrically connected between said fixed and said variable resistors,
said meter calibrated to indicate temperature as a function of current flow therethrough and further including,
switching means in said circuit electrically interconnecting said fixed resistor, variable resistor and second meter terminal in a first position and disconnecting said fixed resistor, variable resistor and second meter terminal in a second position,
a probe housing said variable resistor, and including a body and a tip, said variable resistor arranged in heat conductive relationship with said tip, whereby changes in the temperature of said tip effect changes in the temperature of said variable resistor,
the wires electrically connecting said variable resistor to said first voltage source and said switching means include an elongate cord,
said switching means including a jack,
said cord having a plug at one end which when mated with said jack puts said switching means in the first position,
said cord having a jack at the other end,
a test resistor and a normally closed switch connected in series across said cord within said cord jack,
said probe having a plug attached to said housing and electrically connected to said variable resistor, and
said probe plug when mated with said cord jack electrically interconnects said variable resistor and cord and opens said normally closed switch in said cord jack, whereby removing said probe from said cord and inserting said cord into said jack electrically connects said test resistor into said circuit in place of said variable resistor,
a bleeder resistor of substantially high resistance electrically connected across said switching means, whereby a small constant flow of current passes from said voltage sources when said switching means is disconnected.

7. The invention of claim 6 wherein,
said variable resistor comprises two thermisters electrically connected in series and physically arranged in heat conductive relationship with said probe tip,
said voltage sources comprise mercury battery cells, and
said probe is mechanically arranged to be impervious to autoclave temperatures and pressures.

8. A probe for use with an electric thermometer including:
a body having,
a tip on one end, and
a plug on the other end for insertion into a jack,
a plurality of thermisters electrically connected in series and arranged in heat conductive relationship with said tip, said thermisters being matched to give the desired total resistance, said thermisters being electrically connected to contacts carried by said plug, whereby the thermisters will be electrically connected to said thermometer when the plug is inserted in a thermometer jack.

9. The invention of claim 8 wherein said plurality of thermisters is defined as two thermisters paired to give the total resistance desired.

References Cited

UNITED STATES PATENTS

| | | |
|---|---|---|
| 2,753,714 | 7/1956 | Perkins et al. |
| 3,153,769 | 10/1964 | Moses. |
| 3,217,544 | 11/1965 | McElvenny. |
| 3,250,991 | 5/1966 | Beeston. |
| 3,377,862 | 4/1968 | Gheorghiu. |
| 3,402,378 | 9/1968 | Catlin et al. |

OTHER REFERENCES

Torkelson, D. et al., REC Temperature Measuring Systems . . . In Rosemount Engrng. Co. Short Form Catalog: Appendix G, Bulletin #7624. Rev. A. pp. 36–38. Received in Patent Office Library Oct. 31, 1962. Copy in 73–362 (R).

S. CLEMENT SWISHER, Primary Examiner

F. SHOON, Assistant Examiner

U.S. Cl. X.R.

338—28